United States Patent Office 3,636,100
Patented Jan. 18, 1972

3,636,100
PREPARATION OF ADIPIC ACID BY NITRIC ACID OXIDATION OF NITROSOCYCLOHEXANE DIMER
Werner H. Mueller, Gulf Breeze, and John J. Hicks, Jr., and Charles R. Campbell, Pensacola, Fla., assignors to Monsanto Company, St. Louis, Mo.
No Drawing. Filed Nov. 19, 1969, Ser. No. 878,245
Int. Cl. C07c 51/24
U.S. Cl. 260—537 P    5 Claims

ABSTRACT OF THE DISCLOSURE

Adipic acid is produced in high yields by oxidation of the nitrosocyclohexane dimer with aqueous nitric acid in the liquid phase.

BACKGROUND OF THE INVENTION

It is known in the prior art that adipic acid can be produced by oxidation of cyclohexane with aqueous nitric acid in the liquid phase. This reaction, however, leads to the simultaneous formation of nitrocyclohexane according to the following equations, wherein the radical-like $NO_2$ molecules are provided by the aqueous nitric acid:

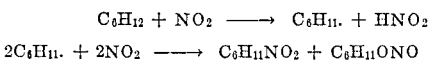
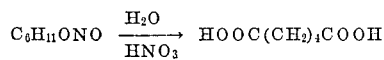

$$C_6H_{11}ONO \xrightarrow[HNO_3]{H_2O} HOOC(CH_2)_4COOH$$

The nitrocyclohexane once formed by the reaction remains substantially unchanged under the reaction conditions employed. Unfortunately, nitrocyclohexane is an undesirable by-product and represents a loss in adipic acid yields as well as an increase in nitric acid consumption.

An object of the present invention is to provide a one-step process for the production of adipic acid by nitric acid oxidation in the liquid phase wherein high yields of adipic acid are obtained without formation of undesirable nitrated by-products. Other objects and advantages of the invention will be apparent from the following description thereof.

SUMMARY OF THE INVENTION

In accordance with the objects of the invention, it has been discovered that nitrosocyclohexane dimer can be converted in high yields to adipic acid by oxidation thereof in the liquid phase at temperatures ranging from about 60° to 130° C. with aqueous nitric acid having a concentration between about 30% to 70% by weight on an aqueous basis. The process provides an attractive route for adipic acid production for several reasons: high yields of adipic acid are obtained (e.g. 80%); the nitrosocyclohexane dimer is readily available; and the process is easily carried out with a minimum of materials.

PREFERRED EMBODIMENTS OF THE INVENTION

The process may be carried out either continuously or by a batch operation and at atmospheric pressures. A catalyst may be used in carrying out the oxidation, for example, a copper and/or vanadium catalyst. Vanadium is conveniently added as any vanadium salt, for example, ammonium vanadate, sodium vanadate, vanadyl nitrate, vanadyl sulfate, etc. Copper can be added as the metal (which is then converted to the nitrate) as the oxide or as other salts, e.g. the acetate, nitrate, sulfate, etc. On an aqueous basis, the catalysts are usually present in amounts ranging from 0.05 to 1.5% by weight. The catalysts can be used singly or in combination. Particularly good results are attained by conducting the oxidation in the presence of copper and vanadium. If desired, silica and/or alumina may also be used in combination with the catalysts. The inclusion of silica or alumina has been observed to influence, to an extent, the ratio of glutaric to succinic acids formed by the oxidation.

It is preferred to employ a molar excess of nitric acid based on the nitrosocyclohexane dimer in the reacting mixture, for example, 2 to 60 moles of nitric acid per mole of nitrosocyclohexane dimer. The reaction temperature can be varied within the above-stated range. Higher temperatures, however, have the effect of increasing the rate of the reaction, and therefore it is generally desirable to employ temperatures between about 75° and 120° C.

The following examples are intended to illustrate the invention and are not intended to in any way limit the scope thereof.

EXAMPLE 1

Ten milliliters of an aqueous solution of 60% by weight nitric acid containing by weight on an aqueous basis 0.5% Cu, added as $Cu(NO_3)_2$, and 0.3% V, added as $NH_4VO_3$, was heated in a stirred reaction flask equipped with a reflux condenser and thermometer. Then, over a 30 minute period 1.06 grams of nitrosocyclohexane dimer was slowly added to the reaction mixture while maintaining the temperature at 80° C. by means of external cooling. After all the nitrosocyclohexane dimer had been added, the temperature of the reaction mixture was increased to 100–110° C. and kept at this temperature to complete the reaction (1 hour). The weight ratio of nitric acid feed material to nitrosocyclohexane dimer was 10:1. Analysis of the reaction product showed that 1.09 grams of adipic acid was formed which represented a yield of 79.5%, based on the weight of dimer aded, and that 0.076 gram of glutaric acid (6.1% yield) and 0.05 gram of succinic acid (4.5% yield) were formed. Substantially no nitrated by-products were formed.

EXAMPLES 2–8

In Examples 2–8, the procedure of Example 1 was followed except that in Example 2 no catalyst was employed and in Examples 3, 4 and 6–8 a different catalyst was employed. The results of these experiments are given in the following table.

TABLE

| | Experiment Number and catalyst | | | | | |
|---|---|---|---|---|---|---|
| | 2 | 3 | 4 | 5 | 6 | 7 |
| Yield, percent of Theory | None | 0.5% Cu | 0.3% V | 0.3% V, 0.5% Cu | 0.5% Cu, 0.3% V, 0.8% Al$_2$O$_3$ | 0.5% C 0.3% V, 1.0% SiO$_2$ |
| Adipic acid | 72.7 | 67.6 | 72.4 | 81.0 | 79.2 | 76.6 |
| Glutaric acid | 9.6 | 4.4 | 9.7 | 6.0 | 6.5 | 5.5 |
| Succinic acid | 10.7 | 8.9 | 6.3 | 4.4 | 4.2 | 5.3 |

The above examples merely illustrate preferred conditions for carrying out the process of the invention. However, in general, the oxidation of nitrosocyclohexane dimer with aqueous nitric acid in the liquid phase can be carried out employing a wide range of reaction conditions without departing from the scope of the invention, i.e., at temperatures between about 60° and 130° C. utilizing a molar excess of nitric acid having a concentration between about 30% and 70% by weight on an aqueous basis.

What is claimed is:

1. A process for the production of adipic acid which comprises oxidizing nitrosocyclohexane dimer in the liquid phase at temperatures between about 60° and 130° C. with aqueous nitric acid having a concentration between about 30% and 70% by weight on an aqueous basis.

2. The process of claim 1 wherein the oxidation is carried out in the presence of 0.05% to 1% of at least one catalyst selected from the group consisting of vanadium salts and copper metal, copper oxide and copper salts.

3. The process of claim 2 wherein the catalyst is copper and a vanadium salt.

4. The process of claim 2 wherein a molar excess of nitric acid is present.

5. The process of claim 4 wherein the concentration of the nitric acid on an aqueous basis is about 60% by weight.

References Cited

UNITED STATES PATENTS

| 2,343,534 | 3/1944 | Cavanaugh et al. | 260—537 |
| 2,465,984 | 3/1949 | Doumani et al. | 260—537 |
| 2,750,415 | 6/1956 | Hamblet et al. | 260—537 |

LORRAINE A. WEINBERGER, Primary Examiner

V. GARNER, Assistant Examiner